United States Patent [19]
Rieser et al.

[11] 3,808,077
[45] Apr. 30, 1974

[54] METHOD FOR LAMINATING PLASTIC TO GLASS EMPLOYING GLASS MOLD

[75] Inventors: Raymond G. Rieser, Lower Burrell; Joseph Chabal, Curtisville, both of Pa.

[73] Assignee: PPG Industries, Inc., Pittsburgh, Pa.

[22] Filed: Sept. 16, 1971

[21] Appl. No.: 181,137

[52] U.S. Cl. ............... 156/102, 156/99, 156/104, 156/106, 156/228, 156/242, 156/289, 161/190, 161/192, 161/199
[51] Int. Cl. ............... B32b 17/10, B32b 31/04
[58] Field of Search ............ 156/99, 101, 102, 104, 156/242, 245, 247, 228, 289, 344, 106; 117/5.1, 124 F; 161/190, 199, 192; 264/331, 338

[56] References Cited
UNITED STATES PATENTS

| | | | |
|---|---|---|---|
| 2,184,876 | 12/1939 | Sherts | 156/247 X |
| 2,475,194 | 7/1949 | Nyquist | 117/5.1 X |
| 3,248,758 | 5/1966 | Schmitz et al. | 117/5.1 UX |
| 3,341,646 | 9/1967 | Britain | 264/331 X |
| 3,471,356 | 10/1969 | Kolb et al. | 161/190 X |
| 3,505,160 | 4/1970 | Michaels et al. | 161/199 X |
| 3,509,015 | 4/1970 | Wismer et al. | 156/99 X |
| 3,522,142 | 7/1970 | Wismer et al. | 161/190 |
| 3,620,905 | 11/1971 | Ahramjian | 161/190 |
| 3,625,792 | 12/1971 | Shaffer | 156/99 X |
| 3,630,812 | 12/1971 | Bruckner | 161/199 X |
| 3,657,057 | 4/1972 | Shorr et al. | 161/199 X |

*Primary Examiner*—George F. Lesmes
*Assistant Examiner*—Lorraine T. Kendell
*Attorney, Agent, or Firm*—Edward I. Mates

[57] ABSTRACT

Fabricating a transparent, laminated window having an exposed sheet of plastic material softer than glass adhered to glass, such as a bilayer windshield consisting essentially of an outer glass sheet and an inner preformed sheet of polyurethane plastic produced by lamination under heat and pressure with the polyurethane sheet supported in pressurized engagement against a smooth surface of a mold, which is preferably a second glass sheet having a shape conforming to that of the glass sheet of the resulting laminated window. The windshield is fabricated by assembling a preformed plastic sheet between a glass sheet to be laminated thereto and the mold with a suitable parting material between the mold and the plastic sheet to facilitate separating the mold and the bilayer windshield readily after lamination is completed. The assembly is exposed to elevated heat and pressure to effect the lamination. Preferably, the mold has certain physical properties the same as the glass sheet to be laminated so as to minimize optical distortion of the preformed plastic during lamination.

14 Claims, 4 Drawing Figures

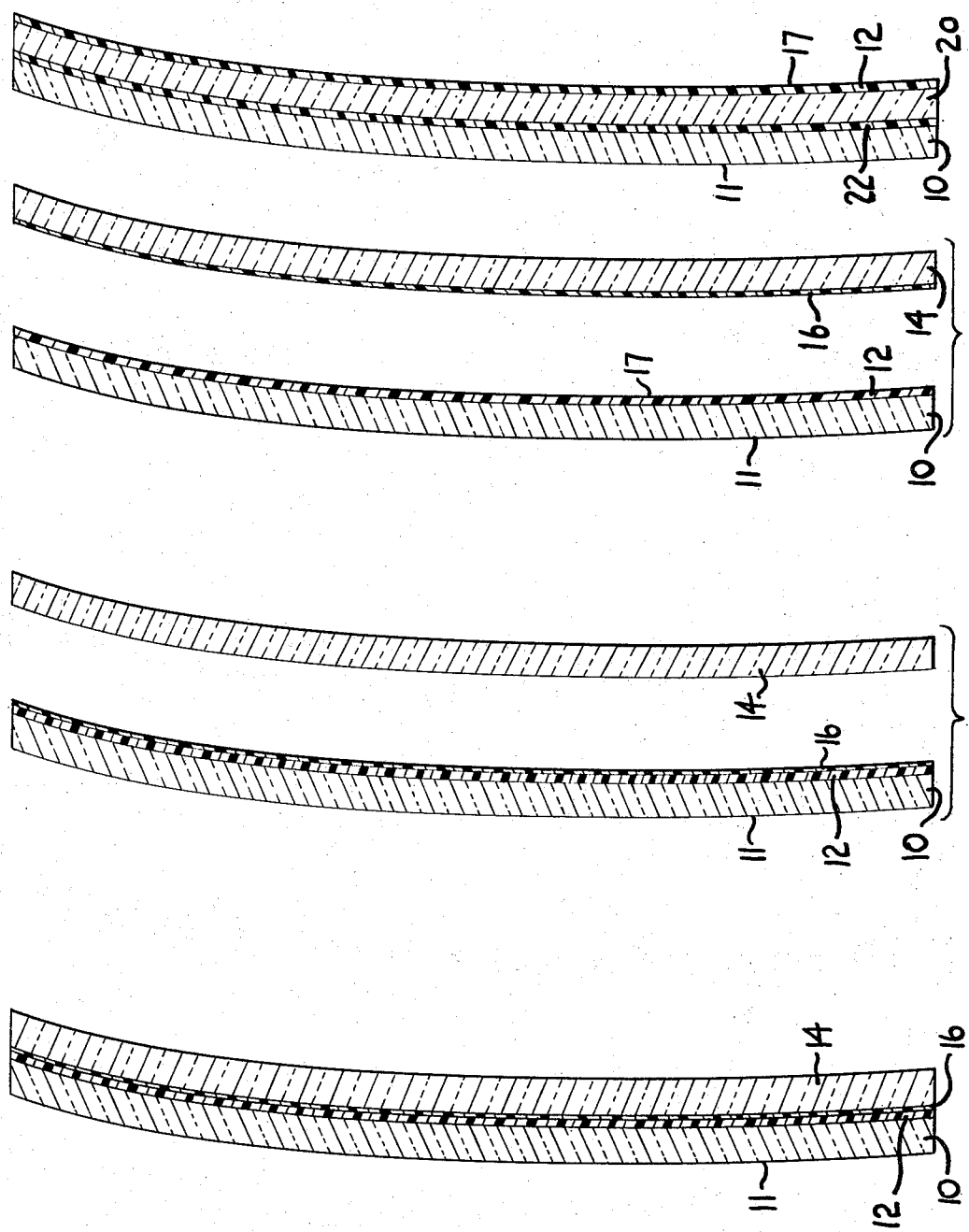

METHOD FOR LAMINATING PLASTIC TO GLASS EMPLOYING GLASS MOLD

BACKGROUND OF THE INVENTION

The present invention relates to laminated safety glass which is commonly employed for windshields of an automobile and for other industrial uses. While most commercial present day automobile windshields comprise two sheets of glass and a thermoplastic interlayer, the present invention relates to a method of producing laminated windows having an exposed layer of plastic resin, particularly "bilayer windshields" consisting essentially of one transparent glass sheet and one transparent sheet of plastic resin, such as polyurethane resin. The term "bilayer windshields" used throughout this specification is not limited to two layer laminates, but relates to any laminated window including a sheet of glass laminated to a layer of a plastic having a smooth surface (opposite that facing the glass) in pressurized engagement with a laminating mold during lamination. A thin protective coating may be present on or absent from the smooth surface. Such "bilayer windshields" may find use as side lights or back lights as well as windshields of automobiles or as closures for other vehicles as well as buildings. The term is also to be interpreted as covering laminated articles in which the glass sheet surface facing away from said plastic resin is in turn laminated to one or more plies of transparent material as in bullet-resisting glass and laminated windows having at least two glass plies alternating with plastic with an anti-lacerative coating of plastic on the glass surface facing the interior of the vehicle, and the like.

U.S. Pat. No. 2,047,253 to Brooks suggests that a piece of laminated glass composition of two sheets of glass secured together by a single sheet of plastic material is less resistant to breakage by impact than is a single piece composed of a single layer of glass and a single layer of plastic each the same as where two pieces of glass are used. Falling ball tests show that laminates made with a single layer of glass is at least 50 percent stronger than laminates having two layers of glass, according to this patent. This improved strengthening of a so-called bilayer windshield is alleged to be due to the fact that there is no shearing effect when only one piece of glass is used while in the standard laminated glass windshield, the plastic tends to be sheared between the fractured layers of glass. Despite this suggestion in the Brooks patent, laminated windshields for automobiles have continued to be fabricated with two sheets of glass and a plastic interlayer. It is suggested that the reason for this lack of change in windshield structure has been due to the lack of a suitable fabrication technique for making bilayer windshields.

U.S. Pat. No. 2,120,628 to Reid claims a bilayer windshield having one glass sheet and one layer of a polyvinyl acetal resin treated in such a manner to produce properties superior for laminates. However, all the Examples recited in this patent refer to producing glass-plastic laminates in which the polyvinyl acetal resin sheet is interposed between a pair of glass sheets. Again, it is suggested that the absence of an Example disclosing how to fabricate a bilayer is due to the absence of knowledge of a suitable fabrication technique.

U.S. Pat. No. 2,184,876 to Sherts suggests laminating a single sheet of plasticized polyvinyl acetal to glass using an outer face of unplasticized resin to protect what would be an exposed surface of plasticized polyvinyl acetal. A thin flexible sheet plated with chromium is suggested as a parting material over the resin sheet. This patent shows only a flat laminate whose shape can be accommodated by a thin chromium plated flexible sheet. Such a sheet cannot be shaped readily to conform to a concave shape and cannot be formed in a permanent shape except for a flat shape.

U.S. Pat. No. 3,509,015 to Wismer et al. suggests laminating bilayer windshields consisting of only one layer of glass with a polyurethane layer and suggests producing such laminates by casting the polyurethane between one glass sheet and a mold member (made of glass or other material), which is coated with a release agent. The technique suggested by Wismer et al provides peripheral spacers to define the space for the cast resin. The resin polymerizes when heated to form a layer that adheres to glass. This is a slow, batch process.

Since preformed polyurethane sheets are easier to handle than cast liquids when assembling the elements to be fabricated into a bilayer windshield, the present invention prefers handling preformed polyurethane sheets for bilayer windshield fabrication. However, since elevated pressure and temperature is required to laminate a preformed polyurethane sheet to glass, the prior art was discouraged from fabricating a bilayer windshield using a preformed polyurethane sheet, since it is difficult to remove the release mold that protects the exposed surface of the preformed polyurethane sheet during lamination without having the release mold harm the polyurethane surface during the step of separating the release mold from the polyurethane sheet after lamination is completed.

Any material used as a parting material or as a mold release agent between the mold and the plastic layer that is even slightly adherent to the plastic layer causes an uneven surface of the plastic sheet when the mold is removed after subjecting an assembly to heat and pressure to laminate the bilayer windshield. Any resulting optical defect annoys the driver and other occupants of the vehicle and is likely to be rejected commercially.

Curved bilayer windshields have an outer ply of glass having a generally convex surface facing the outside of the vehicle to which an inner polyurethane sheet coextensive throughout the entire extent of the outer glass sheet is laminated. The polyurethane inner sheet has a generally concave surface facing the interior of the vehicle. The problem of removing a mold from the polyurethane sheet of the bilayer formed by heat and pressure lamination is further complicated by the fact that the mold surface held in pressurized engagement against the concave surface of the plastic layer of the bilayer windshield so laminated must be convexly curved.

The resulting laminated bilayer windshield thus tends to wrap itself about the mold, which makes the step of separating the mold from the bilayer windshield further complicated. The resulting transparent laminated window must have a relatively soft plastic inner sheet presenting a smooth, concave surface facing the interior of the vehicle that is free of optical defects laminated to at least one glass sheet that is harder that the inner plastic sheet. The relatively soft, plastic inner layer causes the resulting laminate to exhibit a lower Severity Index and less lacerative damage than a more conventional laminated glass windshield having an innermost glass ply.

SUMMARY OF THE INVENTION

The present invention comprises assembling a preformed plastic sheet of approximately uniform thickness rather than a cast-in-place resin between a preformed glass sheet that serves as a mold and a preformed glass sheet that becomes part of the bilayer windshield. The glass sheet that serves as a mold preferably has the same physical properties such as Young's modulus, hardness and thermal expansion coefficient as that of the glass sheet to be laminated to the preformed plastic sheet to avoid localized distortion of the interposed plastic sheet during the heating and pressure application steps associated with lamination. In addition, the glass sheet that serves as a mold provides a smooth rigid surface having a shape conforming to that of the glass sheet to be laminated. Hence, there is uniform pressure applied to the preformed plastic sheet while the latter is pressed against the glass sheet to be laminated. These features enables the plastic sheet to retain its uniform thickness characteristic after the laminating cycle of pressure and temperature is completed. The mold is of a material that is more rigid than that of the preformed plastic sheet throughout the temperature range presently experienced during laminating.

Preferably, the glass sheet forming the mold has a shape conforming to that of the glass sheet to which the preformed plastic sheet is to be laminated and approximately the same thickness as that of the glass sheet to be laminated so that as the temperature and pressure applied through the glass sheets against the opposite surfaces of the plastic sheet varies during the laminating cycle, the effect on the plastic sheet is approximately uniform throughout the extent of the plastic. Any parting material between the mold and the preformed plastic sheet is less than 0.005 inch thick and preferably approximately 0.002 inch or less to minimize any effect that causes a non-uniform temperature or pressure from surface to surface of the plastic sheet during lamination.

According to a further embodiment of this invention, a parting material is selected that adheres to the plastic sheet but not to glass. This is helpful in protecting a laminated windshield having a plastic layer of polyvinyl butyral exposed to the pressure of the mold.

DETAILED DESCRIPTION OF THE INVENTION

POLYURETHANES FOR FABRICATING BILAYER WINDSHIELDS

The preferred type of self healing, transparent resin useful as the inner layer of the so-called "bilayer windshield" is a polyurethane composition, preferably from the class of polyurethane compositions derived by reacting an organic polyisocyanate with a material having a multiplicity of active hydrogen sites, for example, a polyether polyol and/or a polyester polyol or a polyamine.

Suitable polyether polyols are disclosed in U.S. Pat. No. 3,509,015 to Marco Wismer et al., assigned to PPG Industries, Inc. This class of polyurethanes has previously been used as an interlayer for laminated safetyglass windows and is generally thermosetting and formed by casting in the liquid state between a pair of sheets to be laminated and curing in situ by heat to produce the laminate.

Other preferred polyurethane compositions suitable for use in the present invention contain hydroxyl terminated polyesters of the type described in U.S. Pat. No. 2,871,218 to Charles S. Schollenberger. These are usually thermoplastic and can be preformed into sheets. Other suitable polyurethane resins are described in "Polyurethanes Chemistry and Technology" by J. H. Saunders and K. C. Frisch, published by Interscience Publishers in 1964.

The polyurethane materials are particularly useful because they are transparent, have high abrasion resistance, are impervious to atmospheric conditions and maintain a strong, permanent laminate bond with glass. Both thermosetting and thermoplastic urethanes can be laminated to glass to form bilayer windshields.

A thermosetting type polyurethane is one in which there is a considerable amount of cross linking between polyurethane chains. Such cross linking occurs, for example, in the curing of so-called polyurethane "prepolymers," which are linear, isocyanate-terminated polycarbamate esters of a diisocyanate and a diol, with a tri-functional curing agent such as a glycol having three or more hydroxyl groups and/or a polyamine having three or more amino groups.

A thermoplastic polyurethane is one which contains only substantially linear polyurethane chains with only minimal cross linking among the chains. The thermoplastic polyurethanes flow under the influence of heat and pressure and can therefore be extruded or calendered in sheet form. The thermosetting polyurethanes, on the other hand, because of the cross linking among the individual polymer chains, do not flow well under the influence of heat and pressure, and if extruded or calendered, have significant optical distortion as to make them less suitable for bilayer windshield applications.

Polyurethanes of the thermosetting type used in bilayer windshields are the reaction product of an organic polyisocyanate and a glycol, which is cured and cross linked with an organic compound having at least three active hydrogen atoms. Preferably, an isocyanate-terminated "prepolymer" which is formed from the reaction of an organic polyisocyanate and a glycol is first formed. This "prepolymer" forms one package of a two-package system. The curing agent forms the other package. Immediately before use, the two packages are mixed.

Among the organic polyisocyanates that can be employed are the various organic compounds containing two or more isocyanato groups or mixtures of such compounds, including aromatic, aliphatic and cycloaliphatic diisocyanates and triisocyanates, and combinations of these types. Representative compounds include 2,4-toluene diisocyanate, meta-phenylene diisocyanate, 4,4'-diphenylene diisocyanate, 3,3'-dimethyl-4,4'-diphenylene diisocyanate, 1,5-maphthylene diisocyanate, 1,4-tetramethylene diisocyanate, 1,5-hexamethylene diisocyanate, 1,10-decamethylene diisocyanate, 1,4-cyclohexyl diisocyanate, 4,4'-methylene-bis-(cyclohexyl isocyanate), 1,5-tetrahydronaphthylene diisocyanate, paraxylene diisocyanate, toluene diisocyanate, and 1,2,4-benzene tri-isocyanate. Arylene diisocyanates, i.e., those in which each of the two isocyanate groups is attached directly to an aromatic ring are preferred. The sterically hinderd diisocyanates such as 3,5-diethyl-methylene-bis-(4-phenylene isocyanate) and o,o'-diethyl-parabenzene diisocyanate in which the isocyanate groups differ in reactivity may also be used. The diisocyanates may contain other substituents which do not react with the isocyanate group. In the case of aromatic fused ring diisocyanates, the isocyanate groups may be attached either to the same or to different rings. Dimers of the monomeric diisocyanates, and di-(3-isocyanato-4-methylphenyl)urea may be used.

The glycol component is particularly important and preferably is a polyether made from a poly(oxypolymethylene) glycol, wherein the glycol contains oxypolymethylene groups in which the linear chain of from about 3 to 6 carbon atoms separate each adjacent pair of oxygen atoms. Representative polyethers include those of the following formula:

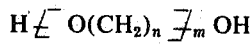

where $n$ is from 3 to 6 and $m$ can be varied considerably, for example, from 2 to 30 or higher, preferably being between 6 and about 20. Included are poly(oxytetramethylene) glycols, which are preferred, and poly(oxytrimethylene) glycols, as well as poly(oxypentamethylene) glycols, and poly(oxyhexamethylene) glycols.

It is desirable that the polyether have a molecular weight between about 400 to 3,500 with a preferred range of from about 550 to about 1,800. While polyurethane compositions made from poly(oxypolymethylene) glycols falling outside of the preferred molecular weight range have good optical transparency and good adhesion to glass, use of these glycols leads to polyurethanes which do not have optimum physical properties for use in making the bilayer windshield of this invention. If the poly(oxypolymethylene) glycol has a molecular weight below 550, the polyurethane is too brittle at low temperatures. If the poly(oxypolymethylene) glycol has a molecular weight above 1,800, the polyurethane lacks rigidity at high temperatures such that in sufficient impact resistance is attained in the resultant bilayer windshield.

In reacting the polyisocyanate with the polyether, ordinarily the amount of polyisocyanate utilized is sufficient to react one mol of the polyisocyanate per hydroxyl equivalent of the polyether. However, this ratio is not critical except for the obtaining of optimum results, and higher or lower amounts can be employed. Higher amounts are preferred to make the so-called "prepolymers," while lower amounts merely result in less than complete utilization of the glycol in the polyurethane formation and may result in the plasticizing effect on the polyurethane.

It is preferred to utilize the polyisocyanate and the polyether in the form of the so-called "prepolymer," in which the polyisocyanate is partially reacted with the polyol to form an isocyanato-terminated adduct, which is then cured. "Prepolymers" made from toluene diisocyanate and poly(oxytetramethylene) glycols are commercially available under the trademark ADIPRENE.

The curing agent employed can be any organic compound containing at least three active hydrogens per molecule; preferably the active hydrogen is in a hydroxyl group, at least in part. The term "active hydrogen" herein refers to labile hydrogen atoms as determined by the Zerewitinoff method, i.e., in which the organic compounds are reacted with Zerewitinoff reagent to determine the lability of the hydrogen atom, see The Journal of the Americal Chemical Society, Volume 49, page 3,181 (1927). The curing agents include: polyols and amines.

When polyols are utilized as curing agents, they must be ones which have three or more labile hydrogen atoms per molecule and which are compatible in reaction system. Examples of polyols which can be employed include: trimethylol propane, trimethylol heptane, trimethylol ethane, pentaerythritol, sorbital, castor oil, etc.

When a polyol is used as a sole curing agent, it is desirable to react it with a "prepolymer" which has been formed by reacting a glycol with excess polyisocyanate over the amounts required to react with the glycol to form an isocyanate-terminated prepolymer, that is, in excess of one mol of the polyisocyanate per hydroxyl equivalent of the glycol. Thus, it is preferred to use a total of more than 2 mols of polyisocyanate per mol of glycol. Preferably, a total of about 4 mols of polyisocyanate per mol of glycol is present, although twice this much or even more can be used. Generally, however, lowered pot life and other processing difficulties, as well as less than optimum properties, are encountered when too large an excess of polyisocyanate is present.

A curing agent comprising a mixture of a polyol having three or more hydroxyl groups and a diol may also be used. In such curing agents, the various polyols having three or more hydroxyls, such as those mentioned above, are employed with any of a wide variety of diols, for example, the lower molecular weight glycols, such as ethylene, propylene, butylene, pentalene and higher or substituted alkylene diols, and various hydroxyl-substituted aryl compounds. Particularly useful are 1,4-butane diol, 2,2-bis(4-hydroxylcyclohexyl) propane, 1,5-pentane diol, 2-methyl-2-n-propyl-1,3-propane diol, bis(hydroxyethyl) ether of resorcinol and bis(hydroxyethyl) ether of hydroquinone. With these curing agents, the polyol functions as a cross linking agent and the diol as a chain extender.

In order to obtain optimum results, the polyoldiol curing agent is used in amounts so that the total of the labile hydrogen atoms of the curing agent is approximately stoichiometric equal to the free isocyanate groups of the "prepolymer." Operative results, however, are accomplished when this amount is varied within 5 percent above the stoichiometric point or varied within 10 percent below the stoichiometric point. Preferably the amount of polyol-diol curing agent is within 3 percent of its stoichiometry.

In order to obtain the optimum curing results with polyurethanes made with various molecular weight poly(oxypolymethylene) glycols, certain diol-polyol curing agent ratios should be employed, for example, there are preferably employed about 3.5 equivalents of dial for each equivalent of polyol with the higher molecular weights poly(oxypolymethylene) glycols, i.e., molecular weight about 1,250 to 1,800, about six equivalents of diol for each equivalent of polyol with the intermediate molecular weights (650 to 850), and about nine equivalents of diol for equivalent of polyol with the lower molecular weights (about 500 to about 650). However, generally satisfactory resinous interlayer compositions can be made with ratios of diol to polyol ranging from 1.5:1 to 10:1.

It has also been found that the physical properties of the product can be changed to a certain extent by employing either a diol which imparts plasticizing properties to the final polymer or one which imparts rigidity to the final polymer, straight chain poly(butylene oxide) glycol being an example of the former and 2,2-bis(4-hydroxycyclohexyl) propane being an example of the latter. These can permit use of higher or lower molecular weight glycols than those mentioned.

Another type of curing system comprises a polyamine in conjunction with a polyol. While it is possible to use a polyamine alone as a curing agent for "prepolymers" made from poly(oxypolymethylene) glycols pot lives are greatly reduced, although "prepolymers" made with higher molecular weight glycols (e.g., 2,000–3,000) can be cured with polyamines alone and have workable pot lives. By adding various amounts of various polyols, it is possible to adjust the curing time of the resinous composition to prolong the pot life and also to employ lower molecular weight glycols, with good results.

Polyamines having 2,3,4,5, or six reactive amine groups are operative. Particularly desirable are aromatic diamines such as 4,4'-methylene-bis(2-chloroaniline), diamino diphenyl sulphone, 4,4-diamino benzophenone and diallyl melamine. Other polyamines which may be used include the amino triazines such as melamine and the alkyl substituted melamines, benzoguanamine, the aliphatic polyamines and other aromatic diamines such as ortho-, meta- and para-phenylene diamine and para, para'-methylene dianiline.

Any one of a wide variety of polyols can be utilized along with a polyamine. For example, the lower molecular weight glycols, such as ethylene, propylene, butylene, pentylene and the higher alkaline diols can be used, as can lower molecular weight poly(alkylene oxide) glycols such as polypropylene oxide glycol having a molecular weight between 250 and 400 and various hydroxy substituted aryl compounds. Particularly useful are 1,4-butane diol, 1,5-pentane diol, 2,2-bis(4-hydroxycyclohexyl) propane, reaction products of polyols with alkylene oxides, trimethylol propane, trimethylol ethane, pentaerythritol, caster oil, and trimethylol heptane.

In order to obtain optimum results, the polyaminepolyol curing system should be used in amounts such that the sum total of the labile hydrogen atoms of the curing agent be stoichiometrically balanced with the isocyanate radicals of the prepolymer. However, fairly good properties are obtained when less than the theoretical amount of the labile hydrogen atoms are present, in which case many of the thus-formed urea hydrogen atoms probably react with the remaining isocyanate radicals to produce additional cross linking. It is preferred that at least 80 percent of the stoichiometric amount of curing agent be employed, whereas a slight excess over the theoretical amount can also be tolerated.

The thermosetting, resinous polyurethane is ordinarily prepared by first heating a "prepolymer" of a glycol and a polyisocyanate under a vacuum for about 1 to 2 hours. The prepolymer is then mixed with the curing agent in a suitable vessel. The mixture is then further heated under vacuum in order to remove any gases which are present or which are entrained during the mixing. At this point, the thermosetting, resinous polyurethane is ready to be cast to an appropriate casting cell to make a bilayer windshields. This casting procedure is discussed in detail in U.S. Pat. No. 3,509,015 and further description of the casting procedure may be found in said patent.

The thermoplastic types of polyurethanes are prepared by reacting an organic polyisocyanate with a long chain glycol and a compound containing two active hydrogen atoms per molecule reactive with the isocyanate groups. Reaction is conducted until a solid, but still thermoplastic material is obtained. Then the reaction is interrupted and the plastic is extruded, calendered or pressed into a sheet. Thermoplastic polyurethanes and manufacturing techniques are described in U.S. Pat. No. 2,729,618.

Thus, for example, the organic polyisocyanates that can be employed are the various organic compounds containing two or more isocyanato groups, or mixtures of such compounds, including aromatic, aliphatic and cycloaliphatic diisocyanates and tri-isocyanates and combinations of these types. Examples of various organic polyisocyanates which can be used in making the thermoplastic polyurethanes are those described above for use in making the thermosetting type of polyurethanes. Preferred organic polyisocyanates are dinuclear cyclic aliphatic diisocyanates, such as 4,4'-isopropylene-bis-(cyclohexyl isocyanate) and 4,4'-methylene-bis-(cyclohexyl isocyanate). The latter is commercially available in a 55:45 (percent by weight) trans:cis stereoisomer mixture from the du Pont Company under the trademark "HYLENE W."

The long chain glycol used in making the thermoplastic polyurethanes are hydroxy-terminated polyesters having a molecular weight of from about 500 to 20,000, preferably about 750 to 5,000 and optimally about 1,000 to 3,300. The molecular weight is determined by hydroxyl end group analysis and by the formula:

$$\text{Molecular weight} = \frac{\left(\begin{array}{c}\text{functionality of}\\ \text{hydroxy-termi-}\\ \text{nated polyester}\end{array}\right)(56.1)(1000)}{\text{OH Number}}$$

The hydroxy-terminated polyester is formed by polyesterifying a polycarboxylic acid and a polyhydric alcohol. Since the polyesters are hydroxy-terminated, they should be prepared such that there is an excess of polyol to polyacid. Preferably, a molar ratio of more than one polyol to polyacid should be used. Reaction conditions for polyesterifications which include time, temperature, ratio of ingredients and catalyst usage are well known in the art and can be found in the following references: Herman E. Boening, "Unsaturated Polyester Structure and Properties," Elsevier, New York, 1964 and Bjorksten, "Polyesters and Their Application," Reinhold, New York, 1956.

The hydroxy-terminated polyesters used in making the thermoplastic polyurethanes are preferably the esterification products of an aliphatic di basic acid or anhydride with an aliphatic diol. Suitable aliphatic dicarboxylic acids are alkylene dicarboxylic acids having 4 to 14 carbon atoms in which the alkylene radical may be, for example, adipic, succinic, pimelic, suberic, azelaic or sebacic moieties. Besides the saturated species, unsaturated dicarboxylic acids or anhydrides such as maleic acid, maleic anhydride, fumeric acid and itaconic acid can also be used.

The aliphatic diols are preferably saturated and contain from 2 to 15 carbon atoms. Examples include ethylene glycol, 1,3-propane diol, 1,4-butane diol, 1,3-butane diol, 1,6-hexane diol, 1,8-octane diol and 1,10-decane diol. Unsaturated diols such as 2-butene-1,4-diol and 2-butyne-1,4-diol can also be used.

The most preferred hydroxy-terminated polyester is poly-1,4-butylene adipate having a molecular weight of from about 1,000 to about 3,300.

Besides the hydroxy-terminated polyesters, the organic polyisocyanates also react with an additional compound containing at least two active hydrogen atoms as determined by the Zerewitnoff list mentioned earlier.

The compounds containing the active hydrogen groups which are reactive with the isocyanate moieties preferably contain only two active hydrogen atoms and are the aliphatic diols containing from about 2 to 15 carbon atoms inclusive. Examples include a saturated aliphatic diol such as ethylene glycol, 1,3-propane diol, 1,3-butane diol, 1,4-butane diol, 1,6-hexane diol, 1,8-octane diol, 1,10-decane diol. Also, unsaturated aliphatic diols such as 2-butene-1,4-diol and 2-butyne-1,4-diol can be employed.

Besides the preferred aliphatic diols, amine or amine-diol mixtures which contain at least two and preferably only two active hydrogen atoms per molecule can be used as the active hydrogen-containing compound.

The amines which can be employed can be primary or secondary diamines in which the radicals attached to the nitrogen atoms can be saturated or unsaturated aliphatic or alicyclic radicals. Also, the radicals can be aromatic, aromatic-substituted aliphatic, aliphatic-substituted aromatic or hetrocyclic radicals can also be employed. Mixed amines in which the radicals are different such as, for example, aromatic and aliphatic can be employed and other reactive groups can be present attached either to carbon atoms or nitrogen atoms, such as carboxyl, hydroxyl, halogen or nitroso. Examples of suitable aliphatic and alicyclic diamines are the following: 1,2-ethanediamine, 1,2-propanediamine, 1,3-propanediamine, 1,3-butanediamine 1,4-butanediamine, 1,5-pentanediamine, 1,6-hexanediamine, 1,8-octanediamine, diaminopropyltetramethylenediamine, 1,8-menthanediamine, and isophoronediamine.

Aromatic diamines such as the phenylene diamines and the toluene diamines can be employed. Exemplary of the aforesaid amines are: O-phenylenediamine, M-phenylenediamine, P-phenylenediamine, 4-M-tolylenediamine, and P-tolylenediamine. N-alkyl and N-aryl derivatives of the above amines can be employed such as, for example, N,N-dimethyl-O-phenylene-diamine, N,N'-di-p-tolyl-M-phenylenediamine, N,N'-di-2-naphthyl-M-phenylenediamine, N,N-dimethyl-P-phenylenediamene, N,N'-diethyl-P-phenylenediamine, N,N'-di(sec-butyl)-P-phenylenediamine, P-aminodiphenylamine, N,N'-diphenyl-P-phenylenediamine and N,N'-di-2-naphthyl-P-phenylenediamine.

In addition to the aliphatic diols, and amines, other active hydrogen-containing compounds which are useful in making the thermoplastic polyurethanes include the broad spectrum of compounds in which the active hydrogen atom is attached to oxygen, nitrogen or sulfur. Useful compounds are those which include at least 2 (in any combination) of the following substituents: -OH, -SH, -NH, -NH$_2$, -COOH, -CONH$_2$, SO$_2$OH, -SO$_2$NH$_2$ and CONHR where R is an organic radical. The moities attached to each of the above-listed substituents can be aliphatic, aromatic, cycloaliphatic or the mixed type. Examples of suitable active hydrogen-containing compounds which fit the above description are the following: polyoxyalkylene glycols such as diethylene glycol, cycloaliphatic diols such as 1,4-heclahexane dimethanol, aromatic dihydric phenols such as resorcinol and hydroquinone and the bis-(beta-hydroxy ethyl)ethers of both resorcinol and hydroquinone as well as 4,4-dihydroxydiphenyl dimethyl methane. Aminoalcohols, diamines, sulfoamides, mercapto-terminated derivatives and mixtures, and the like, can be employed. Exemplary of suitable mixed types are: monoethanolamine, 4-aminobenzoic acid, 4-aminobenzamide, sulfanilamide, aminopropionic acid, 4-hydroxybenzoic acid, p-aminophenol and beta-hydroxypropionic acid. Suitable sulfonamides include: 1,3-propane-disulfonamide, 1,4-cyclohexane-disulfonamide and 1,4-butane-disulfonamide.

In addition to the preferred aliphatic polyesters, polyesters can be prepared which have aromatic moieties in the polyester chains in which the aromaticity is derived from either the dicarboxylic acid or the diol moieties. Examples of various aromatic dicarboxylic acids could be used to prepare such aromatic polyesters are terephthalic acid and isophthalic acid. Examples of aromatic diols include resorcinol, bis-(beta-hydroxyethyl)either of hydroquinone and 4,4'-dihydroxy diphenyl dimethyl methane.

The thermoplastic polyurethanes for the laminated windshield of the invention can be prepared in several ways. The so-called "prepolymer method" offers selective control of the polymerization steps. By this method, the polyester is first reacted with an excess of diisocyanate to give an intermediate molecular weight adduct or "prepolymer." The prepolymer can then be polymerized (chain-extended) with diols, diamines, or other active hydrogen compounds. Some cross linking can be obtained by the use of a minor portion of some triol or other trifunctional material in the curing step. If the thermoplastic polyurethane is to be extruded into sheet form, the amount of cross linking should be minimal since cross linking will inhibit the polymer from flowing under the heat and pressure of extrusion. As a consequence, extruding a polyurethane with substantial cross linking will result in an optically distorted sheet.

In addition to the prepolymer route where the reaction of isocyanate with polyester is completed before the active hydrogen compound (alternatively referred to herein as "curing agent") is added, all components may be mixed simultaneously in a so-called "one-shot" process. This method is generally satisfactory when all active hydrogens react at about the same rate such as when all contain hydroxyl groups as the only reactive sites. When a diamine active hydrogen curing agent is included, however, the procedure is usually successful only if special catalysts are added to selectively catalyze the reaction with hydroxyl groups so that their reactivity becomes similar to that of the amine groups. Otherwise, the diamine reacts first forming a polyurea which separates from the reaction mixture. Particularly useful catalysts are the tin catalysts such as dibutyltin dilaurate and stannous octoate.

For optimum results, the water content of the hydroxyl-terminated reactants should be as low as possible, since the isocyanate moieties are moisture sensitive.

The isocyanate reaction should generally be conducted under anhydrous conditions with dry reactants, such as in a nitrogen atmosphere, at atmospheric pressure and at a temperature of between about 70° C. and about 200° C. The reaction is conducted until there is essentially no free isocyanate or hydroxyl groups (i.e., less than about 0.6 percent and preferably less than 0.3 percent by weight NCO.)

Catalysts although not required for all reactions are preferably employed such as, for example, the aforementioned tin catalysts, dibutyl tin dilaurate and stannous octoate. UV absorbers, such as 2,4-dihydroxy benzophenone or a substituted benzotriazole sold commercially by Geigy Chemical Corporation under the trademark TINUVIN are preferably employed for the aromatic diisocyanates but are generally not required for the more stable aliphatic diisocyanates. Thermal stabilizers may be required for some of the compositions such as, dilauryl thiodipropionate and the hindered phenolics.

The processing conditions which may be used and the final polymer properties will govern the choice of curing agent. When the prepolymer method is employed, the prepolymer is preferably heated to a temperature which will be above the melting point of the curing agent and which will reduce the prepolymer viscosity to a few hundred or at most a few thousand centipoises so as to aid in mixing and prevent solidification of the curing agent. The curing agent is usually heated above its melting point also. The mixing of the prepolymer with curing agent is a critical step and the agitation should be excellent.

Similar or superior results can be obtained by the "one-shot" method if the exotherm is properly controlled and if the relative rates of reactions of all components are adjusted to be nearly the same. Otherwise, a catalyst must be employed.

The ratio of reactants can vary depending upon the materials employed and the intended use of the urethane but preferably the total number of labile or active hydrogen atoms is approximately equivalent to the number of isocyanate groups. The -NCO to active or labile hydrogen ratio is generally from between about 0.9 and about 1.1. The ratio of hydroxy-terminated polyester to active hydrogen-containing compound can vary over wide ranges depending on, among other things, the molecular weight and chemical identity of the hydroxy-terminated polyester, the type and molecular weight of active hydrogen-containing compound. For example, when the hydroxy-terminated polyester is the preferred poly(1,4-butylene adipate) having a molecular weight between about 1,000 and 3,000 and the active hydrogen-containing compound is the preferred 1,4-butane diol, the ratio of hydroxy-terminated polyester to active hydrogen-containing compound is between about 1:1 to 1:6.

After reaction is substantially complete, the polymer is preferably transferred directly to an extruder and extruded and/or milled and calendered to the desired thickness or the partially polymerized material can be further polymerized in the forming equipment. When it is not possible to make a direct transfer from the reaction apparatus to the forming apparatus, the polyurethane material can be poured into trays and the like and allowed to harden into blocks. The trays are preferably coated with an extruded sheet of the same urethane material so that the polymer does not adhere to the tray or removal is sometimes difficult. Suitable coating materials are halogenated hydrocarbons sold commercially by du Pont under the trademark "TEFLON." The polymer can then be processed when desired and where the processing requirement requires smaller pieces, the polymer is preferably cut while warm to permit the polymer to be more easily cut and cooled to make granulation easier. Conventional rubber mills, calendering rolls such as described in U.S. Pat. No. 2,186,584, and extruders can be employed to form the polymer into sheet form. The material is then preferably sandwiched between a non-adherent protecting material such as polyethylene to exclude dust and preferably sealed in a container to exclude moisture. It may be desirable to coat the polymer with a powder such as sodium bicarbonate in order to prevent adjacent sheets from adhering to each other. Before use in a laminate, it is desirable to control the moisture content in the polymer such as by drying in an oven at a temperature of between about room temperature and about 120° F. for from a few hours up to about 3 days or more. Before lamination, the powder, if employed, can be removed in a water bath and the sheet dried. The polyurethane can then be placed with other materials to form the desired laminate.

As a substitute for the polyurethanes described above, the transparent plastic material of the plastic ply of the "bilayer windshield" and the like may be a polyvinyl acetal such as plasticized polyvinyl butyral resin coated with a thin film of protective material such as the unplasticized resin. Plasticized polyvinyl acetal resins have the required transparency, tensile strength and flexibility also found in polyurethane resins. Polyvinyl butyral is prepared as recited in U.S. Pat. No. 2,400,957 to Stamatoff, and is commonly used as the interlayer of laminated glass windshields because of its adhesion to glass when subjected to suitable temperatures and pressure, because it is transparent when bonded between two sheets of glass and because of its resistance to elongation whenever an object impacts upon a laminated safety glass window such as the multilayer safety glass laminate described herein.

The polyvinyl acetal resins may be made from various unsubstituted aldehydes or mixtures thereof or even from unsubstituted ketones containing an active carbonyl group or from mixtures of unsubstituted aldehydes and ketones. Thus, formaldehyde, acetaldehyde, propionaldehyde, butyraldehyde, valeraldehyde, hexaldehyde, benzaldehyde, crotonaldehyde, cyclohexanone and the like and mixtures thereof may be used. In general, the acetal resin is made by reacting an aldehyde with hydrolyzed polyvinyl ester in the presence of a solvent with a product and precipitating the resin product with water. Alternate methods might include carrying out the reaction in the presence of a nonsolvent dispersing medium such as water or a non-solvent mixture of water and solvent, for example, a water-ethanol mixture. In general, polyvinyl acetal resins made from saturated or unsubstituted aliphatic aldehydes are the most suitable. These would include polyvinyl acetal resins made from unsubstituted saturated aliphatic aldehydes containing less than six carbon atoms and especially those made from formaldehyde, acetaldehyde, butyraldehyde, and mixtures thereof. Particularly preferred are polyvinyl acetal resins made from butyraldehyde, the so-called polyvinyl butyral, the preferred molecular weight range is from 150,000 to 250,000. The polyvinyl acetal resins may be considered to be made up on a weight basis of from 5 to 25 percent hydroxyl groups, calculated as polyvinyl alcohol, 0 to 40 percent acetate groups, calculated as polyvinyl acetate and the balance being essentially acetal. When the acetal is butyraldehyde acetal, the polyvinyl acetal resin will preferably contain on a weight basis, from 16 to 25 percent hydroxyl groups calculated as polyvinyl alcohol and from 0 to 10 percent acetate groups calculated as polyvinyl acetate, the balance being essentially butyraldehyde acetal. Polyvinyl acetal resins, particularly polyvinyl butyral, are well known in the art as efficient innerlayers for laminated safety glass windshields. Therefore, further description of the polyvinyl acetal resins is not necessary, as those skilled in the art are well aware of these materials and their methods of preparation. More details on the preparation of polyvinyl acetal resins are found in U.S. Pat. Nos. Re. 20,430 and 2,496,480.

Conventionally, polyvinyl acetals, particularly polyvinyl butyral is used in safety-glass laminates, contains a plasticizer. Generally, the plasticizer used is a water-insoluble ester of a polybasic acid and a polyhydric alcohol. Particularly desirable plasticizers for use in the present invention are triethylene glycol di(2-ethyl butyrate), dibutyl sebacate, di(beta-butoxy-ethyl) sebacate and dioctyl phthalate.

Various plasticized polyvinyl acetal resins are described in detail in U.S. Pat. No. 2,372,522.

Many well-known plasticizers suitable for use with polyvinyl butyral are disclosed in U.S. Pat. No. 2,526,728 to Burk et al. The most commonly used are monocarboxylic aliphatic acid esters of ether glycols, such as triethylene glycol di-2 ethyl butyrate.

Generally, the plasticizers used are water-insoluble esters of a polybasic acid or a polyhydric alcohol. Particularly desirable plasticizers for use in the present invention are triethylene glycol di(2-ethyl-butyrate), dibutyl sebacate, di(beta-butoxy-ethyl) adipate, and dioctyl phthalate. Other suitable plasticizers include triethylene glycol fully esterified with a mixture of 80 – 90 per cent caprylic acid and 10 – 20 per cent capric acid as described in U.S. Pat. No. 2,372,522, dimethyl phthalate, dibutyl phthalate, di(butoxyethyl) sebacate, methyl palmitate, methoxyethyl palmitate, triethylene glycol dibutyrate, triethylene glycol diacetate, tricresyl phosphate, triethyl citrate, butyl butyryl lactate, ethyl para-toluene sulfonamide, dibutyl sulfone, lauryl alcohol, oleyl alcohol, glycerol triricinoleate, methyl lauroyl glycolate, butyl octanoyl glycolate and butyl laurate. The above list of plasticizers does not represent all the known plasticizers which can be used. Such a list would be impractical and would serve no purpose since one skilled in the art can readily select a plasticizer from the many already known.

It should be mentioned that although the polyvinyl acetal results can be used in the practice of this invention certain precautions should be taken when using these inner-layer materials. The materials are particularly susceptible to moisture and if care is not taken, the moisture will permeate the polyvinyl acetal innerlayer and weaken the bond between the innerlayer and the outer glass ply. To prevent this, a thin, protective moisture-resistant coating can be imposed on the exposed surface of the polyvinyl acetal sheet. Such a protective coating would be, for example, the unplasticized polyvinyl acetal as in the aforesaid U.S. Pat. No. 2,184,876 to J. H. Sherts, which could be applied by conventional spraying or brushing techniques.

Also, the exposed surface of the polyvinyl-acetal innerlayer could be protected by vapor depositing a surface layer of $SiO_2$ thereon. Such a technique is described in British Pat. No. 1,144,099.

Further, the exposed surface of the polyvinyl acetal innerlayer could be protectively coated with a thin polyurethane layer of the type described hereinbefore.

GLASS COMPOSITIONS SUITABLE FOR FABRICATING BILAYER WINDSHIELDS

Any well known commercial plate, float or sheet glass composition or any other transparent glass generally used in windows is suitable for use as the outer glass sheet of a bilayer windshield. Particularly suitable compositions are those of the soda-lime-silica type which may include or exclude a glass tinting composition such as about one-half per cent of iron oxide. The glass sheet is preferably between about 0.01 inch and 0.13 inch thick.

Preferably, the present invention relates to the formation of bilayer windshields whose outer ply is a commercial soda-lime-silica glass such as glasses having the following composition:

| | Percent by weight |
|---|---|
| $Na_2O$ | 10–15 |
| $K_2O$ | 0–5 |
| CaO | 5–15 |
| $SiO_2$ | 65–75 |
| MgO | 0–10 |
| $B_2O_3$ | 0–5 |

A typical soda-lime-silica glass suitable for use in accordance with this invention has the following composition:

| | Percent by weight |
|---|---|
| SiO | 71.38 (usual variation 71 to 74%) |
| $Na_2O$ | 12.76 (usual variation 12 to 14%) |
| $K_2O$ | 0.03 (usual variation 0 to 1%) |
| CaO | 9.67 (usual variation 8 to 12%) |
| MgO | 4.33 (usual variation 2 to 5%) |
| $Na_2SO$ | 0.75 (usual variation 0.1 to 1.0%) |
| $Fe_2O_3$ | 0.15 (usual variation 9.1 to 1.0%) |
| $Al_2O_3$ | 0.81 (usual variation 0.1 to 1.0%) |

A similar glass sheet may be used as a mold during lamination of the bilayer windshield and held against an exposed surface of the polyurethane sheet. However, the mold differs from the glass sheet in at least two respects. The glass sheet used in the bilayer is assembled either in face to face relation with the polyurethane sheet or has an adhesion promoter at the interfacial surface. The mold is provided with a layer of parting material interposed between the mold surface that faces the polyurethane and the polyurethane sheet to facilitate separation of the mold from the bilayer. According to an invention of Thomas P. Snyder described and claimed in U.S. Pat. application Ser. No. 181,130, filed Sept. 16, 1971, the major surface of the mold may be provided with a special release coating. The mold may have a peripherally grooved portion which may be coated with a tape that is adherent to glass and nonadherent to polyurethanes, such as polytetrafluoroethylene tape sold under the trade mark of TEFLON, as taught by an invention of Harry E. Littell, Jr. described and claimed in U.S. Pat. application Ser. No. 181,129, filed Sept. 16, 1971.

If desired, the mold may be chemically tempered by ion exchange at an elevated temperature below the strain point as taught in U.S. Pat. No. 3,477,834 to John W. Morris after grooving its margin and before applying a special release coating to its surface. A typical chemical tempering operation involves immersing the mold in a potassium nitrate bath for 6 hours at 900° F. This treatment strengthens the glass mold without distorting its shape and enables the mold to be reused in the fabrication of many bilayer windshields.

ADHESION PROMOTERS FOR FABRICATING BILAYER WINDSHIELDS

In some cases, an adhesion promoter may be necessary to adhere the outer glass ply to the polyurethane ply. Suitable materials include various alkoxy silanes, such as gamma aminopropyltriethoxysilane, sold by Union Carbide Corporation, under the trade mark "A–1100" and Dow Corning under the trade mark "Z–6020"; and N-(beta-amino ethyl)gamma-aminopropyl-trimethoxysilane sold by Union Carbide Corporation under the trade mark "A–1120." The promoter may be incorporated into the urethane reactants, applied externally to the sheet material, or preferably applied to the glass surface. In some cases, an adhesion controlling agent or inhibitor may be necessary such as the alkyl acid phosphates disclosed in Canadian Pat. No. 861,469. Particularly preferred are methyl acid phosphate and stearyl acid phosphate, which have been observed to effect a desirable controlled adhesion with excellent diaphragm action and glass retention when a laminate is broken. It has been found that when laminates are prepared by the cast-in-place method, generally, an adhesion inhibitor is necessary as this method produces laminates in which the urethane is quite strongly adhered to the glass. A promotor may or may not be necessary depending upon the polymer employed when the polyurethane is extruded and/or calendered into a sheet such as when made by the "one-step" bulk polymerization method. The inhibitors are generally added to the urethane reactants although in some cases they may be coated on the sheet material or glass layer. Only a minor amount of adhesion controlling agent is required, if at all, such as from about 0.00001 to about 0.1 percent.

PARTING MATERIAL COMPOSITIONS

The composition used as a parting material between the mold and the preformed plastic sheet may be any material that is sufficiently thin (less than 5 mils thick) to avoid establishing an arrangement through the thickness of the glass sheet to be laminated, the preformed plastic sheet to be laminated, the parting material and the glass sheet that serves as a removable mold during the lamination operation that does not depart significantly from symmetry through the thickness of these elements of the assembly. Limiting the asymmetry of the arrangement limits any unbalanced force applied against the opposite surfaces of the preformed plastic sheet that would cause deviations in plastic sheet thickness sufficient to impart optical distortions in the plastic sheet and hence, to the laminate.

The parting material must be smoothly surfaced, and may consist essentially of a film of material, such as polyvinyl fluoride compositions available commercially under the trade mark of TEDLAR by E. I. de Pont de Nemours and Company of Wilmington, Delaware and described in U.S. Pat. No. 3,451,978. Other suitable parting materials include films of polyethylene glycol terephthalate (sold under the trade mark of MYLAR) and permanent thin metal and metal oxide coatings on the pressure bearing surface of the mold, such as thin films produced by cathode sputtering at temperatures below the strain point of the glass as depicted in U.S. Pat. No. 3,506,556 to F. H. Gillery et al. Controlling the temperature at which the glass sheet mold is processed during the application of a mold coating that serves as a parting material to one well below the deformation temperature of the glass avoids distorting the shape of the mold from one conforming to the shape of the glass sheet to be laminated to the preformed plastic sheet.

A coating composition particularly suitable for providing a parting material suggested by Thomas P. Snyder is preferably taken from organopolysiloxane compounds produced by the hydrolysis and condensation of at least one compound having the formula $T_nSiZ_{(4-n)}$ wherein T independently generally represents a member such as alkyl, alkenyl and aryl, more specifically, methyl, ethyl and propyl through hexyl (both normal and isomeric forms), cyclopentyl, cyclohexyl, vinyl and the normal isomeric forms of propenyl through hexenyl and phenyl; Z independently represents a hydrolyzable group, more specifically a halogen (chlorine, bromine, fluorine and iodine), alkoxy (e.g., methoxy through heptoxy) and acyloxy (e.g., acetoxy, propionoxy, butyroxy, pentanoxy, hexanoxy, etc.) and aryloxy, e.g., phenoxy; and $n$ is a positive integer of less than four and preferably one. Preferred organosiloxane compositions adapted for use according to this invention consist essentially of a solvent solution of methyl trialkoxysilane or a solution of a mixture of methyltrialkoxy-silane and phenyltrialkoxysilane in which the alkoxy group contains less than five carbon atoms. The curable organopolysiloxane compositions and their methods of preparation are disclosed in U.S. Pat. No. 3,451,838 to Alfred J. Burzinski et al., which suggests their use as a hard, acetone resistant, heat resistant coating on a polycarbonate or acrylic surface and in U.S. Pat. No. 3,460,980 to Alfred J. Burzinski that suggests their use as a hard, wear resistant, weather resistant, chemical resistant and easily cleaned coating for metal surfaces.

A composition for providing a superior parting material sold by Owens-Illinois, Inc., as Owens-Illinois glass resin T–650 contains about 89 percent silica by weight. Parting materials with compositions having a high silica content (over 75 percent by weight) have better release properties than lower silica content materials. The parting material adheres better to the mold if the mold is coated with an adhesive promotor of the type suggested for adhering the polyurethane sheet to the glass of the windshield.

Since present day windshields are curved, and glass requires a higher temperature for shaping than is required to laminate glass to plastic, a glass sheet to be the outer ply of a bilayer windshield is usually shaped with one or more glass sheets, one of which becomes a mold that may be reusable in the fabrication of other bilayer windshields. A typical technique for bending glass sheets in multiples by a gravity sagging method near the glass softening point is described in U.S. Pat. No. 3,453,161 to J. S. Golightly. It is also understood that the gravity sag technique may also be employed to bend a single pair of glass sheets or even one glass sheet at a time, if desired.

As an alternate method for shaping the glass sheets to the shape desired for the laminated windshield by the gravity sagging techniques described hereinabove, it is also contemplated to form the individual glass sheets to their desired shape by press bending, then chemically tempering one of the sheets prior to laminating as described and claimed in British Pat. No. 1,202,187 to John Comperatore. The chemically tempered sheet becomes a reusable mold and is preferably chemically tempered by ion exchange at a temperature below the strain point of the glass so that the glass mold retains its shape conforming to that of the glass sheet to be laminated during the chemical tempering. The term "press bending" as contemplated herein may be accomplished by supporting the glass vertically as in U.S. Pat. No. 3,367,764 to Samuel L. Seymour or supporting the glass horizontally as in U.S. Pat. No. 3,374,077 to James H. Cypher and may also include a vacuum assist as depicted in U.S. Pat. No. 3,468,645 to Harold A. McMaster.

FABRICATION OF BILAYER WINDSHIELDS

The desired preformed plies of glass and plastic to form the bilayer windshield are assembled in face to face relation using an adhesion promoter, if desired, at one or both interfacial surfaces. A second glass sheet, that is used as a mold, is assembled with a thin film of parting material facing the other surface of the preformed plastic sheet. Air entrapped between the plies can be removed by placing the assembly in a thin, flexible bag and pulling a partial vacuum. The bag is sealed and lamination completed under pressure by subjecting the assembly to the polyurethane softening temperature. The sealing can be accomplished in from between about 5 and about 10 minutes at a temperature of 300° F. and a pressure of 10–25 pounds per square inch above atmospheric. The laminate can then be placed in an oil or an air autoclave until the laminate is sealed at a temperature of between about 200° and 350° F. for a period between about 45 minutes and 2 hours at a pressure of 50 to 250 pounds per square inch. The autoclave conditions, however, will depend upon the particular polymers employed.

The assembly is cooled, then the pressure reduced and the mold is separated from the rest of the assembly.

DESCRIPTION OF THE PREFERRED EMBODIMENT

According to a preferred embodiment of the present invention two sheets of glass of matched outline are bent simultaneously by heating to their deformation temperature while supported in bending relation to a bending mold, such as one depicted in U.S. Pat. No. 2,933,856 to W. W. Barcikowski et al. or U.S. Pat. No. 2,794,300 to J. S. Golightly. A layer of a suitable parting material, such as an aqueous dispersion of a diatomaceous earth as described in U.S. Pat. No. 2,725,320 to F. V. Atheson et al., is applied between the interfacial surfaces of the two glass sheets to prevent the sheets from adhering to one another during their heating incidental to shaping.

After the glass sheets are bent to conform to the shape of the shaping mold, they are separated from one another and the parting material removed by thoroughly washing the sheets. The shaped glass sheets composed of float glass ⅛ inch thick are now separated and one of them is used as a mold and the other as the outer glass ply of a bilayer windshield.

EXAMPLE A

A number of bilayer windshields consisting of an outer ply of curved glass and an inner ply of plasticized polyvinyl butyral were made by assembling the plies of the bilayer windshield in aligned relation to form a windshield using the following procedure.

For each assembly fabricated, a bent sheet of float glass approximately ⅛ inch thick preshaped to conform to the windshield curvature desired was selected and arranged with its concavely curved surface facing a preformed sheet of commercial plasticized polyvinyl butyral resin having a thickness of 30 mils, 45 mils or 60 mils applied to the concave surface of the float glass sheet. A thin sheet of polyvinyl fluoride having a thickness of approximately 1 to 2 mils was applied to the exposed surface of the plasticized polyvinyl butyral sheet and smoothed. Then, a second sheet of float glass ⅛ inch thick shaped to conform to the shape of the first sheet of float glass was applied to the sheet of polyvinyl fluoride in alignment with the other components of the assembly. The assembly components were taped together and the taped assembly was wrapped in plastic to maintain the alignment of its components and the resulting assembly inserted within a laminated bag of the type disclosed in U.S. Pat. No. 3,311,517 to Leroy D. Keslar and John Rankin. The bag comprised an outer ply of polyethylene glycol terephthalate commonly available under the trade mark of Mylar and an inner ply of polyethylene bonded to the Mylar. The bag had a total thickness not exceeding 5 mils. The bag with the assembly inside was evacuated at a vacuum of about 25 pounds per square inch and the evacuated bag sealed. The sealed unit was placed in an oil autoclave and subjected to a pressure of 200 pounds per square inch at a temperature of 275° F. for 45 minutes. Each unit so treated was cooled in the autoclave with the elevated pressure maintained until the temperature was reduced to approximately 150° F. The pressure was then reduced, and the units removed from the autoclave.

The bags and plastic wrappings were removed from the assemblies. The second glass sheet of each assembly was separated from the polyvinyl fluoride film which remained adhered to the polyvinyl butyral. The resulting laminates had a smoothly surfaced polyvinyl butyral sheet of concave configuration covered by the thin polyvinyl fluroide film on one side and a curved glass sheet having a convex configuration facing the other side.

Impact tests have been developed using a so-called Alderson dummy that impacts a test windshield at a preselected velocity using a sled test facility of the type described in "Eleventh STAPP Car Crash Conference" proceedings page 143 published by the Society of Automotive Engineers, New York, in 1967. A means of determining soft-tissue injury, and particularly, minor soft-tissue injury, has been achieved by covering the head of the Alderson dummy with two layers of a chamois to simulate human skin. Surface lacerations in the form of shallow scratches to the outer layer only are classed as "minor" and given a Lacerative Injury Rating of one, whereas extensive cuts and gouges through both layers of the chamois are considered as "serious" and given a Lacerative Injury Rating of five, with intermediate degrees of damage to the chamois rated two, three or four, depending on the severity of damage to the chamois. For example, dummies whose chamois have a few shallow cuts to the outer layer only are given a Lacerative Injury Rating of two if the inner chamois layer is undamaged, if there are more extensive cuts and gouges to the outer layer only, the Lacerative Injury Rating is three, and if there are many cuts and gouges with a few extending through both layers of the chamois, the Lacerative Injury Rating is four.

Other bilayer windshields were produced using preformed sheets of polyester type of polyurethane between matching glass sheets with a parting material interposed between one of the glass sheets that served as a mold and the preformed polyurethane sheet. The Lacerative Injury Ratings of the bilayer windshields thus formed were compared to those utilizing the more conventional trilayer configuration of two glass sheets and a plastic interlayer.

Examples 1 to 20 describe the preparation of the preformed sheets of various polyester type of polyurethane sheets that can be fabricated into bilayer windshields using a preformed plastic sheet of approximately uniform thickness as the inner sheet of the bilayer windshield and a preformed glass sheet as the mold.

EXAMPLE 1

A poly(1,4-butylene adipate) polyester (785.6 grams, 0.400 mole) having a molecular weight of 1965, a hydroxyl number of 57 and an acid number of 0.5; and a poly(1,4-butylene adipate) polyester (707.4 grams, 0.698 mole) having a molecular weight of 1,014, a hydroxyl number of 111 and an acid number of 0.5 were dried together with agitation in a glass reactor to remove trace amounts of water by heating to 100°–105° C. under 3 millimeters of mercury pressure for about 3 hours. The pressure was released while introducing pre-purified nitrogen and anhydrous 1,4-butanediol, 260.6 grams, (2.892 moles, 0.03 percent $H_2O$) was added over a 1 minute period to the agitated mixture of dried polyesters at 93° C., and the mixture heated to 95° C. in 15 minutes. The resulting mixture was homogeneous. To this homogeneous mixture, 1046.8 grams (3,989 moles) of 4,4'-methylene-bis-(cyclohexyl isocyanate) in a steroismer ratio of 55 percent trans and 45 percent cis (Hylene W) containing 0.280 gram (0.01 percent of the total reactants) of dibutyltin dilaurate catalyst, was added over a one minute period. The butanediol and diisocyanate were at 22° C. and the additions were both made while the reactor was under a nitrogen atmosphere. The resulting mixture was rapidly agitated for about one minute during which time the temperature of the mixture rose from 80° to 95° C. The mixture was poured into a tetrafluoro-ethylene (Teflon) dry coated reactor which was closed and placed in a 130° C. non-circulating continuous purged nitrogen oven (the temperature of the polymer was approximately 143° C) for about 2 hours until the reaction and polyurethane formation was substantially complete. The NCO content of the polymer was 0.07 percent by weight as determined by infrared spectometry. The resultant semi-solid polymer was allowed to cool to room temperature, removed, cut and milled (front roll 180° F. and rear roll 135° F.) and calendered on a three roll mill (top roll 250° F., middle roll 225° F. and bottom roll 215° F.) into sheets approximately 35 mils thick. The polymer had an inherent viscosity at 30° C. at a 0.5 percent concentration of N-methyl-2-pyrrolidone of about 1.40 units before milling and an NCO content of 0.07 percent. The inherent viscosity after calendering was approximately the same (1.41).

Blank sheets of rectangular outline sufficiently large to be trimmed to the shape of a Volkswagen windshield were cut and stored for fabrication into bilayer windshields.

A supply of Owens Illinois glass resin T–650 was pulverized and 200 grams of the powdered organopolysiloxane was dissolved in 575 cubic centimeters of dry butanol. The mixture was stirred at 200 revolutions per minute for approximately one to one and half hours at room temperature to complete the dissolving of the organopolysiloxane in the butanol. The resulting solution was then filtered under vacuum in a Buchner funnel using number three filter paper. This solution contains 30 percent solids by weight and was stored in a polyethylene bottle.

A pair of glass sheets of matching curvature conforming to the shape of a Volkswagen windshield was selected from those previously shaped. One of the glass sheets in the pair was seamed around its entire periphery to provide a peripheral passage extending obliquely inward from the edge surface to the convex curved major surface of the seamed glass sheet.

An adhesive promoting composition consisting essentially of a solution of gamma-amino propyltriethyoxysilane (which is available as Union Carbide "A–1100") was dissolved in butanol in a 0.3 percent by volume concentration. The solution was filtered through number three filter paper in a Buchner funnel under vacuum, then diluted and then was poured over the convex surface of the glass sheet to be used as the mold.

The solution of 30 percent solids that was stored in the polyethylene bottle was diluted with additional butanol to a 15 percent by weight concentration, filtered through number three filter paper under vacuum, degassed until bubbling ended and flowed over the convex surface of the seamed glass sheet. The glass sheet so coated was dried for 30 minutes at room temperature and then cured for 24 hours at 250° F. in a clean oven. After cooling, a tape of polytetrafluoroethylene, such as that sold under the tradename of TEFLON by du Pont, was applied over the edge surface and the beveled portion extending from the edge of the seamed glass sheet and folded over about a 3/16 inch wide frame adjacent the edge along the opposite surface of the glass sheet.

Another adhesive promoter consisting essentially of n-(beta-amino ethyl)gamma-aminopropyl-trimethyoxysilane sold by Union Carbide Corporation under the tradename of "A–1120" was dissolved in a 50 percent by weight isopropanol-50 percent water solution in a 1 percent by weight concentration. The solution was wiped on the concave surface of the glass sheet to be included in the bilayer windshield and dried for approximately 10 minutes at room temperature.

An assembly was then formed comprising the seamed glass sheet, the preformed polyurethane sheet and the other glass sheet to be laminated to the polyurethane sheet. The sheets in the assembly were oriented so that one surface of the polyurethane sheet faced the surface of the glass sheet treated with said adhesive promoting composition and the opposite surface of the polyurethane sheet faced the seamed, coated surface of the mold formed of the glass sheet coated and baked with the Owens-Illinois T–650 glass resin.

The assembly was wrapped in plastic and the plastic-wrapped assembly inserted in a so-called "polymar" bag of the type disclosed in U.S. Pat No. 3,311,517 to Leroy D. Keslar and John Rankin. The bag comprises an outer ply of polyethylene glycol terephthalate and an inner ply of polyethylene bonded thereto. The bag was inserted within a second bag of the same material and the unit evacuated and sealed. The sealed unit was placed in an oil autoclave and subjected to a pressure of 200 pounds per square inch at 275° F. for 45 minutes. The unit was then cooled to room temperature while maintaining an elevated pressure. The pressure was then reduced.

The assembly was removed from the autoclave and the bags and plastic wrapping removed from the assembly. The resulting assembly was placed with its concave side up on a support cart and a razor blade was driven into the peripheral passage formed by seaming the margin of the mold between the tape and the polyurethane sheet to enlarge the passage. A circular tool similar to a pizza cutter was inserted in the opening and the tool was run around the edge of the assembly along the tape to enlarge the peripheral opening around the edge. After completing edge separation to a depth of about one inch, the mold was pried off the bilayer by hand, using a vacuum holder to engage the outer glass ply of the bilayer windshield.

The resulting bilayer windshield had an exposed polyurethane surface that was smooth and free of surface markings inside the frame along which the pizza cutter was applied to enlarge the peripheral passage between the mold and the bilayer windshield. The bilayer windshield had excellent optical properties and was clear and exhibited excellent transmission to visible light.

Other materials suitable to make preformed polyurethane sheets for use in assembling bilayer windshields are described in Examples 2 to 20 hereinbelow.

EXAMPLE 2

In accordance with the general procedure and conditions of Example 1, a poly(1,4-butylene adipate) polyester (2.274 moles) having a molecular weight of 1010 and a hydroxyl number of 111.1 was mixed with a poly(1,4-butylene adipate) (1.295 moles) having a molecular weight of 1,965 and a hydroxyl number of 57.1 to which agitated mixture of dried polyester was added first 7.23 moles of 1,4-butanediol and then 9.99 moles of 4,4'-methylene-bis-(cyclohexyl isocyanate) of 55 trans and 45 cis, and the mixture was heated to 80° C. No catalyst, however, was present and the homogeneous mass was heated at oven temperature between about 122° and 129° C. for 19 hours. The resultant polymer had an inherent viscosity at 30° C. at a 0.5 percent concentration in N-methyl-2-pyrrolidone of about 0.79, and an NCO content of 0.1 percent by weight. The inherent viscosity remained unchanged after calendering. The front roll temperature of the mill was 180° F. and the rear roll 135° F. The top roll of the calendar was 150° F., the middle roll 135° F., and the bottom roll 125° F.

In Examples 3 through 18, the polyurethanes were prepared from the specified materials following the procedure and conditions of Example 1 except as indicated. Inherent viscosities of the prepared polyurethanes were taken at 30° C. at a 0.5 percent concentration in N-methyl-2-pyrrolidone and the NCO content was determined by infrared spectometry.

EXAMPLE 3

1 mole poly(1,4-butylene adipate) M.W. 1014, OH No. 110.7, Acid No. 0.5
0.905 mole of 1,4-butanediol
1.905 moles Hylene W
Reaction time: 19 hours at an oven temperature of 130° C., inherent viscosity 1.21, NCO 0.1 percent.

EXAMPLE 4

1 mole poly(1,4-butylene adipate) M.W. 1965, OH No. 57.1, Acid No. 0.5
3.26 moles 1,4-butanediol
4.26 moles Hylene W
Reaction time: 24 hours at an oven temperature of 130° C., inherent visocsity 0.78, NCO 0.03 percent.

EXAMPLE 5

1 mole poly(1,4-butylene adipate) M.W. 1965, OH No. 57.1, Acid No. 0.5
2.34 moles of 1,4-butanediol
3.34 moles of Hylene W
Reaction time: 19 hours at an oven temperature of 130°–131° C., inherent viscosity 1.03, 0.07 percent NCO.

EXAMPLE 6

1 mole poly(1,4-butylene adipate) M.W. 1965, OH No. 57.1, Acid No. 0.5
3.40 moles 1,4-butanediol
4.40 moles Hylene W
Reaction time: 23¾ hours at an oven temperature of 129°–130° C., inherent viscosity 1.06, 0.1 percent NCO.

EXAMPLE 7

1 mole poly(1,4-butylene adipate) M.W. 1965, OH No. 571.1, Acid No. 0.5
3.11 moles 1,4-butanediol
4.11 moles Hylene W
Reaction time: 19.5 hours at an oven temperature of 128°–130° F., inherent viscosity 0.84.

EXAMPLE 8

1 mole poly(1,4-butylene adipate) M.W. 1965, OH No. 57.1, Acid No. 0.5
2.71 moles 1,4-butanediol
3.71 moles Hylene W
Reaction time: 19 hours at an oven temperature of 130°–131° C., inherent viscosity 0.88.

EXAMPLE 9

1 mole poly(1,4-butylene adipate) M.W. 1965, OH No. 57.1, Acid No. 0.5

3.26 moles 1,4-butanediol
4.26 moles Hylene W
Reaction time: 20 hours at an oven temperature of 130° C., inherent viscosity 1.02, NCO 0.1 percent.

EXAMPLE 10

1 mole poly(1,4-butylene adipate) M.W. 1965, OH 57.1, Acid No. 0.4
3.61 moles 1,4-butanediol
4.26 moles Hylene W
Reaction time: 18 hours at an oven temperature of 130° C., inherent viscosity 0.72, NCO 0.07 percent.

EXAMPLE 11

1 mole poly(ethylene adipate) M.W. 1902, OH No. 590, Acid No. 0.3,
3.51 moles 1,4-butanediol
4.51 moles Hylene Irganox
0.01 percent dibutyltin dilaurate
0.6 pph Irganox 1093, Geigy Chemical Corp. TM for multifunctional hindered phenols
Reaction time: 43 hours at an oven temperature of 128° C., inherent viscosity 0.84, 0.2 percent NCO

EXAMPLE 12

1.76 moles poly(1,4-butylene adipate) M.W. 1010, OH No. 111.1, Acid No. 0.5
1 mole poly(1,4-butylene adipate) M.W. 1965, OH No. 57.1, Acid No. 0.5
7.36 moles 1,3-butanediol
10.11 moles Nacconate H–12, Allied Chemical Corp. TM for 4,4'-methylene-bis-(cyclohexyl isocyanate) in stereoisomer ratio of 70 percent trans and 30 percent cis.
Reaction time: 17½ hours at an oven temperature of 130° C., 0.03 percent NCO, inherent viscosity 0.62.

EXAMPLE 13

1 mole poly(diethylene glycol adipate), M.W. 1007, OH No. 111.4, Acid No. 1.8
2.53 moles 1,4-butanediol
3.53 moles toluene diisocyanate, 80/20 mixture of 2,4-2,6 isomers 0.01 percent dibutyltin dilaurate
Reaction time: 19 hours at an oven temperature of 130° C., (pot temperature 138–142° C.), diisocyanate and catalyst dissolved therein, added at 40° C., no degassing, inherent viscosity 0.85, NCO 0.01 percent.

EXAMPLE 14

1 mole poly(ethylene/propylene adipate), M.W. 1886, OH No. 59.5, Acid No. 0.6
3.49 moles 1,4-butanediol
4.49 moles Hylene W
0.01 percent dibutyltin dilaurate
0.6 pph Irganox 1093, Geigy Chemical Corp. TM for multifunctional hindered phenols
Reaction time: 21 hours at an oven temperature of 130° C., catalyst dissolved in diisocyanate, inherent viscosity 0.87, 01 percent NCO.

EXAMPLE 15

1 mole poly(1,6-hexylene adipate) M.W. 1032, OH No. 108.7, Acid No. 0.2.
2.61 moles 1,4-butanediol
3.61 moles 80 percent 2,4- and 20 percent 2,6- toluene diisocyanates
Reaction time: 19 hours at an ovent temperature of 130° C., no degassing, diisocyanate added at mixture temperature of 60° C., inherent viscosity of polymer 0.25.

EXAMPLE 16

1 mole poly(1,4-butylene adipate) M.W. 1925, OH No. 58.3, Acid No. 0.5
4.55 moles 1,4-butanediol
5.55 moles 80 percent 2,4- and 20 percent 2,6- isomers of toluene diisocyanate
Reaction time: 20½ hours at oven temperature of 126°–130° C., no degassing, slightly yellow polymer due to yellow polyester, some bubbles in polymer, diisocyanate addition started at mixture temperature of 50° C., inherent viscosity 0.56, 0.8 percent NCO.

EXAMPLE 17

1 mole poly(caprolactone), M.W. 1233, OH No. 91, Acid No. 0.02
3.05 moles 1,4-butanediol
4.05 moles toluene diisocyanate of commercial 80/20 isomer ratio of 2,4- 2,6-.
Reaction time: 17¾ hours at an oven temperature of 97° C., no degassing or continuous nitrogen purge, diisocyanate addition started at mixture temperature of 36° C., inherent viscosity 1.73.

EXAMPLE 18

1 mole poly(caprolactone), M.W. 850, OH No. 132, Acid No. - Nil.
2.58 moles 1,4-butanediol
3.58 moles toluene diisocyanate of 80 percent 2,4- and 20 percent 2,6- isomers
Reaction time: 26.5 hours at 92°–100° C., no continuous oven nitrogen purge, diisocyanate addition started at mixture temperature of 38° C., polymer clear but contained gas bubbles, inherent viscosity 0.61 at 30° C. at 0.5 percent concentration in dimethyl formamide.

EXAMPLE 19

In accordance with the general procedure and conditions of Example 1, a polyester (1.00 mole) having a molecular weight of 3,271 (hydroxyl number — 34.3, acid number — 0.1) prepared from 1,4-butanediol and adipic acid was mixed with 5.737 moles of anhydrous 1,4-butanediol at a temperature of about 104° C. under a nitrogen atmosphere, and 6.737 moles of Hylene W was then rapidly added to the vigorously agitated mixture at a temperature of about 95° C. The temperature dropped to 77° C. during the Hylene W addition. The mixture was then degassed by reducing the pressure gradually to 6.5 millimeters of mercury over a couple of minutes and then the reaction mixture was poured into the reaction pot and put in a non-circulating oven under a nitrogen atmosphere and the temperature of the oven maintained at 130° C. for 23 hours. The urethane which was hazy was then removed from the pot, extruded, milled, and calendered.

EXAMPLE 20

The general procedure and conditions of Example 19 were repeated but for the exception that .01 percent of dibutyltin dilaurate catalyst was employed and the reaction mixture was vigorously agitated for 2 minutes during which time the temperature rose from 69 to 95° C. The mixture was then transferred to a TEFLON coated reaction pot and heated in a 143° C. circulating air oven for 3 hours. The resultant urethane was clear. (NCO – 0.03 percent)

The Example compositions (other than Example 19) meet the minimum light transmittance and haze requirements of the automobile code (ANSI Code Z-26.11966 Test No. 18).

TEST RESULTS

At 25 miles per hour impact, conventional trilayer windshields with two ⅛ inch thick float glass sheets and a 30 mil thick plasticized polyvinyl butyral interlayer had an average Lacerative Injury rating of 3.2. By comparison, the following table shows that all the bilayer windshields but one of those tested had a Lacerative Injury Rating of one at impact velocities as high as 31.8 miles per hour.

TABLE

COMPARISON OF LACERATIVE INJURY RATING

| Windshield Configuration | Impact Velocity (Miles per Hour) | Plastic Thickness (MILS) | Rating |
|---|---|---|---|
| F – V – F | 25 (ave.) | 30 | 3.2 (ave.) |
| P – F | 30.5 | 30 | 1 |
|  | 30.6 | 30 | 1 |
|  | 30.7 | 30 | 1 |
|  | 26.4 | 30 | 1 |
| V – F | 24.1 | 60 | 1 |
|  | 30.3 | 60 | 1 |
|  | 23.8 | 60 | 1 |
| V – F | 21.1 | 45 | 1 |
|  | 26.1 | 45 | 1 |
|  | 31.3 | 45 | 1 |
| V – F | 25.3 | 30 | 1 |
|  | 28.5 | 30 | 1 |
|  | 30.3 | 30 | 1 |
|  | 30.5 | 30 | 1 |
|  | 31.8 | 30 | 1 |
|  | 24.4 | 30 | 1 |
|  | 24.7 | 30 | 1 |
|  | 25.4 | 30 | 1 |
|  | 22.2 | 30 | 1 |
|  | 24.8 | 30 | 2 |

(F is ⅛ inch thick float glass; V is plasticized polyvinyl butyral; P is polyester type polyurethane).

BRIEF DESCRIPTION OF THE DRAWINGS

In the drawings which form part of a description of the present invention,

FIG. 1 is a sectional view of an assembly of a mold, a preformed plastic sheet to be formed into the inner ply of a bilayer windshield and a glass sheet to be formed into the outer ply of a bilayer windshield showing how the parting material is arranged with the assembly;

FIG. 2 is an exploded cross-sectional view similar to FIG. 1, showing one embodiment of the present invention, particularly effective when the preformed plastic sheet is polyvinyl butyral;

FIG. 3 is a view similar to FIG. 2 showing an alternate embodiment of the invention; and FIG. 4 is a cross-sectional view of a multi-layer windshield that can be fabricated using the teachings of the present invention.

Referring to the drawings, FIG. 1 shows an assembly of a glass sheet 10 having an outward facing convex surface 11 with its inner concave surface facing a preformed plastic sheet 12. A mold 14, preferably of chemically tempered glass and matching in curvature to that of the glass sheet 10 is assembled on the opposite side of the sheet 12 with a suitable release agent 16 interposed between the mold 14 and the preformed plastic sheet 12.

FIGS. 2 and 3 show two embodiments of the parting material that can be used with the present invention. In FIG. 2, the parting material 16 is a thin film about 1 mil thick of a polyvinyl fluoride composition such as sold under the trade mark of TEDLAR. As shown in FIG. 2, when the mold 14 is removed from the laminated assembly, the parting material 16 remains adhered to the plastic inner layer 12 of the bilayer windshield. When the inner layer 12 is plasticized polyvinyl butyral, it is important that it be protected from direct exposure to moisture and the parting material of this embodiment may serve a dual purpose, first as a parting material during lamination, and a protective coat after lamination.

In order to insure that the protective coating 16 of the FIG. 2 embodiment has smooth, unwrinkled surfaces, it is press polished at a temperature approaching the softening point of the plastic under high pressure, such as above 100° F. to 200° F., depending on the material used and at a pressure of at least 100 pounds per square inch, before its assembly with the mold and the elements of the bilayer windshield. The preformed plastic sheet 12 has smooth surfaces when assembled. However, the pressure applied by the glass sheet mold 14 on one side and the curved glass sheet 10 that forms part of the bilayer windshield on the other side of the plastic sheet 12 insures the maintenance of smooth surfaces.

In FIG. 3, the parting material 16 is in the form of a film that is tightly adherent to the glass mold 14, such as a thin metal oxide coating such as tin oxide, indium oxide, titanium oxide and the like, or a glass resin of the type described hereinabove. When the films are formed by cathode sputtering as in the case of thin metal, thin metal alloy or thin metal oxide films, or by spraying or flowing followed by baking, the temperatures needed to bond the film to the glass is well below the softening point of the substrate. Consequently, the mold 14 retains its shape conforming to that of the glass sheet 10 that becomes included in the curved bilayer windshield that is produced when this type of parting material is applied.

In the FIG. 3 embodiment, the parting material 16 remains on the shaping surface of the mold 14 when the mold is removed from the laminated windshield. The bilayer windshield that is fabricated consists essentially of an outer ply of glass 10 having an outward facing surface 11 of convex configuration and an inner ply 12 of plastic having a surface 17 of concave configuration that faces the interior of the vehicle in which the windshield is installed. While the glass sheet that forms the mold 14 is sufficiently rigid to retain its shape while applying pressure against the preformed sheet 12, it is flexible enough to enable it to be readily separated from the sheet of the bilayer by a simple manual prying operation after lamination is completed. Hence, it is very important that any parting material film applied to the glass mold be sufficiently thin so as to avoid causing the mold to lose its flexibility that facilitates its ready removal from the curved, laminated bilayer windshield.

When bilayer windshields are fabricated using a preformed plastic sheet as part of the assembly to be laminated to one glass sheet, the plastic surface that becomes an exposed surface of the bilayer windshield develops a surface that reproduces the mold surface. Even when a suitable parting material is provided between the mold and the ultimately exposed plastic surface, the intimate contact between the parting material applied to the mold and the plastic sheet necessitates that the separation start at the peripheral edge and be propagated toward the interior of the assembly. How the separation is initiated is crucial to the successful separation of the mold from the bilayer windshield without marring the optical properties in the vision area. Starting the separation at the marginal peripheral portion of the assembly may harm the smooth surface of the plastic sheet in the peripheral portion. However, if due care is taken, and if any damage from the separation is limited to the marginal area that is hidden after installation in a vehicle frame, this damage is localized and does not extend into the vision area of the bilayer windshield.

The specific embodiment of the mold described hereinbefore relates to a flexible glass sheet preferably having a thickness between about 50 mils and 250 mils, and preferably glass that has been chemically tempered to improve its resistance to fracture.

Chemically tempering the glass sheet forming the mold 14 gives it greater flexibility and greater resistance to breakage so that it may be reused many times.

It is readily understood that in fabricating transparent laminates having an outer ply of polyurethane plastic, material other than glass may be used for the mold, particularly if the polyurethane plastic is assembled in the form of a preformed sheet. It is also understood, however, that if the mold is composed of a material other than glass, it must have a thermal expansion coefficient compatible with glass so that localized portions do not expand or contract at a rate significantly different from that of glass. If this criterion is not followed, the preformed plastic sheet becomes compressed in different amounts in different regions so that the plastic sheet develops optical distortion.

It is also understood that while the technique described hereinabove is especially suitable for fabricating bilayer windshields for automobiles, it is equally well suited for use in laminating multiply laminates having one or more layers of transparent material laminated to the surface of the glass sheet facing away from the preformed plastic sheet in the laminated windshield, such as a more conventional automobile windshield comprising two glass sheets adhered together by a thermoplastic interlayer with an innermost layer of plastic. A typical example of such a variation is illustrated in FIG. 4, which shows a multiple ply transparent laminate having an exposed thermoplastic ply 12 from which the mold must be removed providing the concave inner surface 17 of the laminate and a glass sheet 10 providing the convex outer surface of the laminate with an additional glass ply 20 and an additional plastic ply 22 provided in the arrangement shown.

It is understood that a suitable adhesive may be provided at any interfacial surface between plastic and glass in either the bilayer or multilayer windshields provided above.

It is further understood that while the bilayer windshields contemplated to be fabricated consist essentially of an outer ply of glass and an inner ply of polyurethane, other rigid transparent materials such as a plurality of glass and/or rigid transparent plastic, such as polycarbonates and acrylics, may form a single layer or multiply outer portion of the laminate and the mold facing layer of the laminate may be any yieldable plastic material that is preferably thermoplastic that would adhere to the mold except for the provision of a suitable parting material.

When assembling preformed plastic sheets, it is desirable to have the preformed plastic sheets of as nearly uniform thickness as possible, for example, no more than 5 mils and preferably less than one mil difference between the thickest and thinnest portions. Too great a disparity in thickness causes optical distortion.

The mold thickness determines how flexible it is. A glass sheet used as a mold should have a thickness between approximately 50 mils and 250 mils. Thicker glass sheet molds are too inflexible for ready removal from a plastic surface and thinner glass sheet molds are difficult to handle without danger of breakage.

It is understood that the superior results described hereinabove result from the combined contribution of several factors. First, the uniform thickness of the preformed plastic sheet provides an easy method to assemble the glass sheet to be laminated and the mold in uniformly spaced relation from one another initially. Also, the selection of a mold having a shape conforming to that of the glass sheet to be laminated together with physical properties matching those of the glass sheet such as coefficients of thermal expansion, Young's modulus, hardness, etc. over the range of temperatures normally experienced during lamination and, preferably, one as nearly identical as possible as the curved glass sheet to be laminated, reduces the chance of shape distortion that could be imposed on the preformed plastic sheet during lamination if these criteria are not followed.

While glass has been suggested as the preferred composition for the laminating mold, it is understood that the mold may be composed of any material more rigid in its thickness than the plastic at laminating temperatures that has a smooth surface that can be flexed at room temperature such as metals, alloys and other materials that have physical properties compatible with that of glass throughout the laminating temperature range and that can be shaped to a rigid shape conforming to the shape required for the smooth surface of the plastic layer of the "bilayer windshield" and the like.

Typical bilayer windshields for automobiles produced by the teachings of this invention comprise an outer glass sheet 50 to 250 mils thick, typically approximately 65 to 125 mils thick and an inner ply of polyurethane 1 to 100 mils thick, typically ranging from approximately 30 to 60 mils thick. The polyurethane surface facing the interior of the vehicle is optically smooth in its vision area and is self healing when scratched.

The form of the inventive subject matter described in this disclosure represents illustrative preferred embodiments thereof. It is understood that various changes may be made without departing from the spirit of the invention as defined in the claimed subject matter which follows:

We claim:

1. A method of making a transparent, laminated window comprising a smoothly surfaced layer of plastic laminated to a sheet of glass consisting essentially of the steps of
  a. assembling a preformed sheet of a thermoplastic resin from the group consisting of polyvinyl butyral and polyurethane having approximately uniform thickness throughout its entire extent in aligned relation to a glass sheet to be laminated to said preformed sheet to form a sub-assembly,
  b. assembling a glass mold more rigid than said preformed sheet throughout the temperature cycle associated with laminating and having a smooth, rigid surface that conforms to the shape of said glass sheet to be laminated and having physical properties compatible with those of said glass sheet throughout said temperature range experienced while laminating glass to said plastic in aligned relation to said preformed sheet with parting material that is separable from at least one of said mold and said preformed sheet interposed between said mold and said preformed sheet to form an assembly in which said smooth, rigid surface is positioned to apply pressure against said preformed sheet,
  c. maintaining said assembly in said assembled relationship while subjecting said assembly to elevated pressure of more than 50 pounds per square inch and an elevated temperature of approximately 200° to 400° F. for sufficient time to laminate said preformed sheet to said glass sheet and to develop a surface in said preformed sheet that reproduces said smooth, rigid surface,
  d. reducing said pressure and temperature applied to said assembly, and
  e. separating said preformed sheet with said glass sheet laminated thereto from said mold to form a transparent laminate having said surface in said preformed sheet a reproduction of said smooth, rigid mold surface.

2. A method as in claim 1, wherein said glass sheet to be laminated to said preformed sheet is in turn laminated to an additional transparent sheet disposed on the side opposite that assembled facing said preformed sheet.

3. A method as in claim 1, wherein said preformed sheet is a polyurethane.

4. A method as in claim 3, wherein an adhesive is applied to at least one interfacial surface between said preformed sheet and said glass sheet.

5. A method as in claim 1, wherein said mold and said glass sheet of said assembly have curved surfaces of matching configuration.

6. A method as in claim 5, wherein said glass sheet to be laminated is preshaped to a shape desired for said laminated curved window and has a convex surface and a concave surface and said preformed plastic sheet is assembled against said concave surface.

7. A method as in claim 1, wherein an adhesive is applied to at least one interfacial surface between said preformed sheet and said glass sheet to be laminated thereto.

8. A method as in claim 7, further including the step of removing air that may be entrapped in the interfaces of said assembly before said pressure subjection step.

9. A method as in claim 1, wherein said preformed sheet is polyvinyl butyral and said parting material becomes adherent to said preformed sheet under the elevated temperature and pressure conditions existing during said subjecting step, whereupon said parting material separates from said mold with said preformed sheet and said glass sheet.

10. A method as in claim 1, further including the step of removing air that may be entrapped in the interfaces of said assembly before said pressure subjection step.

11. A method of making a transparent, laminated window comprising a smoothly surfaced layer of polyurethane laminated to a sheet of glass comprising:
  a. assembling a preformed sheet of polyurethane having approximately uniform thickness between 1 mil and 100 mils throughout its entire extent in aligned relation to a glass sheet having approximately uniform thickness between 50 mils and 250 mils to be laminated to said preformed polyurethane sheet to form a sub-assembly,
  b. assembling a glass mold more rigid than said preformed sheet throughout the temperature cycle associated with laminating and having a smooth, rigid surface that conforms to the shape of said glass sheet to be laminated and having physical properties compatible with those of said glass sheet throughout said temperature cycle in aligned relation to said polyurethane sheet with parting material that is separable from at least one of said mold and said preformed sheet interposed between said mold and said polyurethane sheet to form an assembly in which said smooth, rigid surface is positioned to apply pressure against said polyurethane sheet,
  c. maintaining said assembly in said assembled relationship while subjecting said assembly to elevated pressure of more than 50 pounds per square inch and an elevated temperature of approximately 200° to 400° F. for sufficient time to laminate said polyurethane sheet to said glass sheet and to develop a surface in said polyurethane sheet that reproduces said smooth, rigid surface,
  d. reducing said pressure and temperature applied to said assembly, and e. separating said polyurethane sheet with said glass sheet laminated thereto from said mold to form a transparent laminate having said surface in said polyurethane sheet a reproduction of said smooth, rigid surface.

12. A method as in claim 11, wherein said glass sheet is curved and has a convex surface and a concave surface and said preformed polyurethane sheet is assembled in aligned relation to said concave surface of said glass sheet to form said sub-assembly, whereby said glass sheet and said preformed polyurethane sheet are laminated to form a transparent, laminated window having a convex surface of glass and a concave surface of polyurethane.

13. A method as in claim 11, wherein an adhesive is applied to at least one interfacial surface between said glass sheet and said preformed polyurethane sheet prior to assembling said sub-assembly.

14. A method as in claim 11, further including the step of removing air that may be entrapped in the interfaces of said assembly before said pressure subjection step.

* * * * *

UNITED STATES PATENT OFFICE
CERTIFICATE OF CORRECTION

Patent No. 3,808,077    Dated April 30, 1974

Inventor(s) R. G. Rieser and J. Chabal

It is certified that error appears in the above-identified patent and that said Letters Patent are hereby corrected as shown below:

Column 4, line 60, "1,5-hexamethylene diisocyanate" should be
--1,6-hexamethylene diisocyanate--

Column 11, line 58, "3000" should be --3300--

Column 20, line 62 after "amino" there should be no large space.

Signed and sealed this 1st day of October 1974.

(SEAL)
Attest:

McCOY M. GIBSON JR.
Attesting Officer

C. MARSHALL DANN
Commissioner of Patents